July 27, 1948.  D. E. WATTS ET AL  2,446,032
HIGH-FREQUENCY GENERATING APPARATUS
Filed Dec. 9, 1944
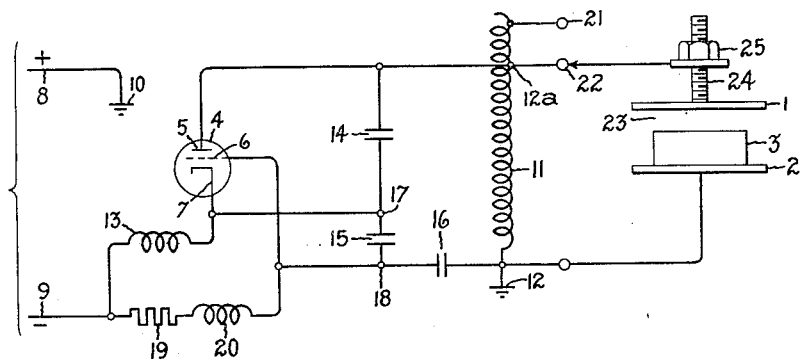
Inventors:
Donald E. Watts,
Julius Vahle Jr.,
by *Harry E. Dunham*
Their Attorney.

Patented July 27, 1948

2,446,032

UNITED STATES PATENT OFFICE 2,446,032

HIGH-FREQUENCY GENERATING APPARATUS

Donald E. Watts and Julius Vahle, Jr., Schenectady, N. Y., assignors to General Electric Company, a corporation of New York Application December 9, 1944, Serial No. 567,416

2 Claims. (Cl. 250—36)

Our invention relates to high frequency generating apparatus, more particularly to high frequency oscillation generator apparatus for supplying power to electric heating apparatus and the like, and has for its object a simple, reliable and efficient generator circuit in which provision is made for preventing hazardous direct current voltages on the exposed parts of the electric apparatus.

More specifically, our invention relates to means for protecting the operator of electric heating apparatus from the hazard of high direct current voltages across the exposed electrically conducting parts accessible to the operator in the event of electric failure of parts of the oscillation generator apparatus. Electric oscillation generators are conventionally supplied with high voltage direct current having a voltage on the order of several thousand volts. This high direct current voltage, however, is not applied to the high frequency circuit, such as the tank circuit, from which the high frequency current is supplied to the heating or other power apparatus. While the high frequency voltages are also substantial, the frequencies are so high that substantially no life hazard is involved in the accidental contact by the operator with a conducting part of the high frequency circuit. Under normal operating conditions, therefore, the apparatus presents no hazard to the operator. In the event of electric failure of parts of the oscillation generator, however, a hazard may be presented by the appearance of the high voltage direct current on parts of the power circuit exposed to the operator.

In carrying out our invention in one form, we provide electric connections whereby the high frequency parts of the apparatus accessible to the operator are grounded with respect to direct currents so that any direct current voltage applied to the high frequency circuit is immediately reduced to a non-hazardous ground potential. In carrying out our invention in one form, we utilize the Colpitts oscillation circuit and ground the positive side of the direct current supply source, and also one end of the tank circuit inductance. The negative side of the direct current supply source connected to the cathode of the oscillator is ungrounded. We also provide suitable high frequency inductances or choke coils to prevent the radio frequency currents from getting into the direct current supply source.

For a more complete understanding of our invention, reference should be had to the accompanying drawing, the single figure of which is a diagrammatic representation of high frequency heating apparatus embodying our invention.

We have shown our invention in one form as applied to high frequency electric heating apparatus of the dielectric type comprising two plate electrodes 1 and 2 which are spaced apart and between which is placed the article or material 3 to be heated, such as a cellulose plastic material. These plates 1 and 2 are electrically connected to the terminals of a high frequency oscillation generator, shown as a Colpitts type generator, supplying current at a suitable desired frequency in conformity with the resistivity of the article or material 3 to be heated, such as a frequency of 20 megacycles.

The oscillation generator comprises a suitable electric discharge oscillator device 4 provided with an anode or plate 5, a grid 6 and a cathode 7. High voltage direct current is supplied to the oscillator device by a positive supply main or connection 8 and a negative supply main or connection 9. In accordance with our invention, the positive supply main 8 is grounded by connecting it solidly by a very short electric conductor to the metal supporting apparatus for the heater, such as a metal cabinet in which the heating apparatus is mounted, these ground connections being indicated by the reference numeral 10. Also, we ground that end of the tank circuit inductance coil 11 which is opposite the anode 5 of the oscillator device, i. e. the lower end as seen in the drawing, the ground connections being indicated by the reference numeral 12 and being made in the same way as the ground connections 10 by a very short electric conductor electrically connected to the metal cabinet housing the heating apparatus. A point 12a on the upper end of the inductance 11 is connected to the anode 5. It will be observed that the ground 12 also completes an electric connection from the positive supply main 8 through ground and the inductance coil 11 to the anode 5. If desired, single ground connections may be used for both the main 8 and the lower end of the coil 11.

The negative direct current supply main 9 is ungrounded and a high frequency choke coil 13 is provided in the electric connection between the supply main 9 and the cathode 7 for the purpose of preventing the flow of high frequency current from the tank inductance 11 through the direct current supply source to ground. Other features of the oscillation generator are three capacitors 14, 15 and 16 connected in series with each other across a portion of the tank inductance 11 to form therewith a resonant tank oscillation circuit. A tap 17 between the capacitors 14 and 15 is connected to the cathode 7, while a tap 18 between the capacitors 15 and 16 is connected to the grid 6 for the supply of a suitable negative bias to the grid. The flow of direct current from the supply main 9 through the coil 13 to the upper end of the tank coil 11 is blocked by the capacitor 14 and to the lower end of the tank coil and ground connection 12 by the capacitors 15 and 16. The capacitor 16 also blocks the flow of direct current from the negative supply main 9 through the grid leak resistor 19 and the high frequency blocking coil 20 to the lower end of the tank inductance 11 and ground connection 12.

It will be observed that all parts of the tank inductance 11 are for direct current voltage purposes connected to the ground 12 and therefore hazardous direct current voltages cannot appear on the tank inductance in the event of electric failure in any part of the apparatus. With the positive supply main 8 grounded as shown, any electric connection that may arise for the supply of direct current from the negative main 9 to the tank inductance 11 is short-circuited by the tank inductance and ground connections to the main 8. It will be understood that the tank inductance 11 is the electrically conducting part of the generator to which are connected the electrodes 1 and 2 manipulated by the operator and to which the operator must have access for the purpose of connecting the electrode 1 to a suitable tap 21 or 22 on the tank inductance 11. The electrode 2 is connected to the lower end of the tank inductance 11.

Preferably, one of the electrodes, as shown the upper electrode 1, is made adjustable so that an air gap 23 of adjustable length can be provided, if desired, between this electrode and the article or material 3 which is being heated. In this way, a part of the high frequency voltage between the plates appears across the air gap 23 whereby the rate of heating can be adjusted. As shown, the electrode 1 is a metal disk, as is also the electrode 2, and the electrode 1 is supported at its center on a threaded rod 24 whereby the position of the electrode can be adjusted by means of the nut 25.

It will be understood that the ground connections 12 for the tank inductance 11 can be provided at any suitable point of the inductance, including its upper end. We prefer, however, to provide the ground connections 12 at the lower end of the tank inductance 11 for the purpose of minimizing the loss of power by high frequency radiation from parts of the apparatus, especially the choke coils 13 and 20 which block the flow of high frequency current from the inductance 11 to the supply connection 9.

With the ground connections 12 at the lower end of the tank inductance as shown, the high frequency voltage appearing on the choke coils 13 and 20 is only a small part of the total high frequency voltage across the tank inductance because of the low reactances of the capacitors 15 and 16 as compared with the capacitor 14. Therefore, the high frequency voltages with respect to ground across these capacitors which appear on the choke coils 13 and 20 are comparatively low, and the power loss by radiation is correspondingly low.

On the other hand, we have found that with the ground connections 12 made at the upper end of the tank inductance, whereby the total high frequency voltage with respect to ground appears at the lower end of the tank inductance and appears to a great extent on the choke coils 13 and 20, the power loss by high frequency radiation is much greater, and in a typical apparatus decreased the efficiency of the generator by 10 per cent.

While we have shown a particular embodiment of our invention, it will be understood, of course, that we do not wish to be limited thereto since many modifications may be made, and we therefore contemplate by the appended claims to cover any such modifications as fall within the true spirit and scope of our invention.

What we claim as new and desire to secure by Letters Patent of the United States, is:

1. High frequency apparatus comprising an electric oscillator device provided with an anode, a cathode and a grid, a tank oscillation circuit including an inductance and three capacitors connected in series with each other and across at least a portion of said inductance, an electric connection between a point of said inductance and said anode, an electric ground connection for another point of said inductance, connections connecting points between different pairs of said capacitors respectively to said grid and said cathode, positive and negative direct current supply connections, a connection between said positive direct current supply connection and said ground connection, electric connections between said negative direct current supply connection and said grid and said cathode including radio frequency choke coils, and terminals on said inductance for the supply of high frequency current.

2. High frequency apparatus comprising an electric oscillator device provided with an anode, a cathode, and a grid, a tank oscillation circuit including an inductance, three capacitors connected in series with each other and across at least a portion of said inductance, an electric connection between said anode and said inductance, an electric ground connection for said inductance, connections connecting points between different pairs of said capacitors respectively to said grid and said cathode, positive and negative direct current supply connections for supplying a direct current to said oscillator device, an electric ground connection for said positive supply connection whereby said positive supply connection is connected to said anode through said ground connections, and electric connections between said negative supply connection and said grid and cathode including radio frequency choke coils.

DONALD E. WATTS.
JULIUS VAHLE, JR.

REFERENCES CITED

The following references are of record in the file of this patent:

UNITED STATES PATENTS

| Number | Name | Date |
|---|---|---|
| 1,624,537 | Colpitts | Apr. 12, 1927 |
| 2,288,364 | McArthur | June 30, 1942 |
| 2,324,525 | Mittelman | July 20, 1943 |
| 2,342,789 | Cassen | Feb. 29, 1944 |

OTHER REFERENCES

Radio for January 1941, page 85. (Copy in Division 51.)